United States Patent
Li et al.

(10) Patent No.: US 9,430,544 B2
(45) Date of Patent: Aug. 30, 2016

(54) CONCURRENT REQUEST HANDLING FOR DATABASE TRANSACTIONS

(71) Applicants: Wen-Syan Li, Fremont, CA (US); Bin Dong, Shanghai (CN); Zheng Long Wei, Shanghai (CN); Yongyuan Shen, Shanghai (CN)

(72) Inventors: Wen-Syan Li, Fremont, CA (US); Bin Dong, Shanghai (CN); Zheng Long Wei, Shanghai (CN); Yongyuan Shen, Shanghai (CN)

(73) Assignee: SAP SE, Walldorf (DE)

( * ) Notice: Subject to any disclaimer, the term of this patent is extended or adjusted under 35 U.S.C. 154(b) by 386 days.

(21) Appl. No.: 13/929,478

(22) Filed: Jun. 27, 2013

(65) Prior Publication Data

US 2014/0379638 A1    Dec. 25, 2014

(51) Int. Cl.
*G06F 7/00* (2006.01)
*G06F 17/00* (2006.01)
*G06F 17/30* (2006.01)

(52) U.S. Cl.
CPC ............................... *G06F 17/30575* (2013.01)

(58) Field of Classification Search
None
See application file for complete search history.

(56) References Cited

U.S. PATENT DOCUMENTS

| | | | |
|---|---|---|---|
| 5,261,069 A | 11/1993 | Wilkinson et al. | |
| 6,363,387 B1 | 3/2002 | Ponnekanti et al. | |
| 6,609,126 B1 * | 8/2003 | Smith et al. | |
| 6,718,349 B2 | 4/2004 | Weedon | |
| 7,164,676 B1 * | 1/2007 | Chakraborty | 370/368 |
| 7,293,028 B2 | 11/2007 | Cha et al. | |
| 7,434,010 B2 | 10/2008 | Duffy et al. | |
| 7,555,499 B2 | 6/2009 | Shah et al. | |
| 7,761,434 B2 | 7/2010 | Surtani et al. | |
| 7,930,274 B2 | 4/2011 | Hwang et al. | |
| 7,970,787 B2 | 6/2011 | Stuy et al. | |
| 8,121,980 B2 * | 2/2012 | Reid et al. | 707/648 |
| 8,775,397 B2 | 7/2014 | Dong et al. | |
| 2003/0217064 A1 | 11/2003 | Walters | |
| 2004/0215883 A1 | 10/2004 | Bamford et al. | |
| 2010/0122172 A1 | 5/2010 | Mongeau et al. | |
| 2010/0211554 A1 * | 8/2010 | Reid et al. | 707/703 |
| 2013/0117233 A1 | 5/2013 | Schreter | |
| 2013/0346380 A1 | 12/2013 | Dong et al. | |

OTHER PUBLICATIONS

Non-Final Office Action for U.S. Appl. No. 13/644,974, mailed Sep. 13, 2013, 19 pages.

(Continued)

*Primary Examiner* — Robert Beausoliel, Jr.
*Assistant Examiner* — Michael Pham
(74) *Attorney, Agent, or Firm* — Brake Hughes Bellermann LLP

(57) ABSTRACT

A request handler may receive transaction requests for transactions to be executed using data of a database, and may classify a first transaction request of the transaction requests as a simple transaction request, and a second transaction request of the transaction requests as a complex transaction request. A key-value store engine may execute a first transaction satisfying the first transaction request, using a key-value store of pre-calculated results determined prior to receipt of the first transaction request, and based on the data, and may update a key-value delta reflecting a change, if any, of the key-value store caused by the first transaction. A relational store engine may cause the at least one processor to execute a second transaction satisfying the second transaction request, using a relational store including a subset of the data, and may update a relational delta reflecting a change, if any, of the relational store caused by the second transaction. A synchronizer may execute a synchronization of the key-value store and the relational store, based on the key-value delta and the relational delta.

18 Claims, 8 Drawing Sheets

(56) References Cited

OTHER PUBLICATIONS

Non-Final Office Action Response for U.S. Appl. No. 13/644,974, filed Dec. 13, 2013, 10 pages.
Notice of Allowance for U.S. Appl. No. 13/644,974, mailed Mar. 4, 2014, 5 pages.
Franz Farber et al; SAP HANA Database-Data Management for Modern Business Applications; Dec. 2011; 7 pages; ACM; NY, USA; (http://dl.acm.org/citation.cfmic=209 4126).
Mark McGill;Real Application Testing Certified for SAP;Mar. 2010;9 Pages;Oracle; CA,USA;(http://www.oracle.com/us/solutions/sap/wp-ora4sap-rat11g-1-303808.pdf).
SAP AG; SAP BusinessObjects Data Services Performance Optimization Guide;Jun. 3, 2009;SAP AG;Walldorf, Germany; (http://help.sap.com/businessobject/product_guides/boexir32/en/xi32_ds_perf_opt_en.pdf.

* cited by examiner

CONCURRENT REQUEST HANDLING FOR DATABASE TRANSACTIONS

CROSS-REFERENCE TO RELATED APPLICATION

This application claims priority under 35 U.S.C. §119 to Chinese Patent Application No. 201310250265.2, filed on Jun. 21, 2013, entitled "CONCURRENT REQUEST HANDLING FOR DATABASE TRANSACTIONS", which is incorporated herein by reference in its entirety.

TECHNICAL FIELD

This description relates to transaction request processing for databases.

BACKGROUND

Various types of databases are commonly used to store, manage, access, and otherwise utilize data. In associated database operations, data may be read, created, updated, deleted, compared, combined, or otherwise manipulated.

In practice, a given database may be accessed in an overlapping or parallel manner by many different users. For example, many users may submit overlapping transaction requests to the same database within a given period of time. In such scenarios, it is important that the data within the database is kept current, accurate, and consistent. For example, data modifications made by a first user must be completed and available prior to using the same data to satisfy a request from a second user, in order to ensure that the second user receives timely and accurate results.

Consequently, a transaction request from a user may be delayed until preceding transaction requests, related to the same data, have been completed. The resulting delay experienced by a given user may, in some cases, be minimal or trivial. However, in scenarios such as those referenced above, in which a large number of concurrent transaction requests are received, users may experience cumulative delays that are unsatisfactory or unacceptable.

In particular, for example, web-based applications, such as e-commerce or social networking applications, may enable millions of users to simultaneously attempt to access one or more databases supporting the corresponding web-based applications. The above-described difficulties may thus be particularly problematic in such scenarios. As a result, users (e.g., customers) of such web-based applications may be dissatisfied, and businesses providing the web-based applications may experience losses in customer loyalty and in profitability.

SUMMARY

According to one general aspect, a system may include instructions recorded on a computer-readable medium, and executable by at least one processor. The system may include a request handler configured to cause the at least one processor to receive transaction requests for transactions to be executed using data of a database, and further configured to cause the at least one processor to classify a first transaction request of the transaction requests as a simple transaction request, and classify a second transaction request of the transaction requests as a complex transaction request. The system may include a key-value store engine configured to cause the at least one processor to execute a first transaction satisfying the first transaction request, using a key-value store of pre-calculated results determined prior to receipt of the first transaction request, and based on the data, and further configured to update a key-value delta reflecting a change, if any, of the key-value store caused by the first transaction. The system may include a relational store engine configured to cause the at least one processor to execute a second transaction satisfying the second transaction request, using a relational store including a subset of the data, and further configured to update a relational delta reflecting a change, if any, of the relational store caused by the second transaction. The system may include a synchronizer configured to cause the at least one processor to execute a synchronization of the key-value store and the relational store, based on the key-value delta and the relational delta.

Implementations may include one or more of the following features. For example, the transaction requests may be received, at a database layer including the database, from at least one application.

The request handler may be configured to classify the first transaction request and the second transaction request based on classification criteria that characterizes a likelihood of satisfaction thereof using the pre-calculated results of the key-value store. A result calculator may be configured to cause the at least one processor to calculate the pre-calculated results of the key-value store, based on a predicted likelihood of future transaction requests to be received by the request handler. The synchronizer may be configured to cause the result calculator to update the pre-calculated results in conjunction with the synchronization, based on the key-value delta and the relational delta.

The key-value store engine may be configured to determine a key associated with the first transaction request, and to perform a look-up of a corresponding value within the key-value store. The key-value store engine may include an invalidity notifier configured to update the relational delta based on the updating of the key-value delta. The synchronizer may be configured to update the relational store based on the relational delta and on updates received from the invalidity notifier of the key-value store engine, and thereafter empty contents of the relational delta.

The relational store engine may include an invalidity notifier configured to update the key-value delta based on the updating of the relational delta. The synchronizer may be configured to update the key-value store based on the key-value delta and on updates received from the invalidity notifier of the relational store engine, and thereafter empty contents of the key-value delta.

The request handler, key-value store engine, relational store engine, and synchronizer may be implemented in main memory of the system. The relational store engine may be configured to cause the at least one processor to update a transaction log stored in non-volatile memory and update the database with any changes thereto caused by the execution of the first transaction or the second transaction.

According to another general aspect, a computer-implemented method for executing instructions stored on a computer readable storage medium may include receiving transaction requests for transactions to be executed using data of a database, classifying a first transaction request of the transaction requests as a simple transaction request, and classifying a second transaction request of the transaction requests as a complex transaction request. The method may include executing a first transaction satisfying the first transaction request, using a key-value store of pre-calculated results determined prior to receipt of the first transaction request, and based on the data, executing a second transaction satisfying the second transaction request, using a relational store including a subset of the data, and updating a key-value delta reflecting a change, if any, of the key-value store caused by the first transaction. The method may include updating a relational delta reflecting a change, if any, of the relational store caused by the second transaction, and executing a synchronization of the key-value store and the relational store, based on the key-value delta and the relational delta.

Implementations may include one or more of the following features. For example, updating the key-value delta may include updating the relational delta based thereon, and updating the relational delta may include updating the key-value delta based thereon. The synchronization may include updating the pre-calculated results in conjunction therewith, based on the key-value delta and the relational delta.

According to another general aspect, a computer program product tangibly embodied on a non-transitory computer-readable storage medium may comprise instructions. The instructions, when executed, may be configured to receive transaction requests for transactions to be executed using data of a database, classify a first transaction request of the transaction requests as a simple transaction request, and classify a second transaction request of the transaction requests as a complex transaction request. The instructions, when executed, may be configured to execute a first transaction satisfying the first transaction request, using a key-value store of pre-calculated results determined prior to receipt of the first transaction request, and based on the data, and execute a second transaction satisfying the second transaction request, using a relational store including a subset of the data. The instructions, when executed, may be configured to update a key-value delta reflecting a change, if any, of the key-value store caused by the first transaction, update a relational delta reflecting a change, if any, of the relational store caused by the second transaction, and execute a synchronization of the key-value store and the relational store, based on the key-value delta and the relational delta.

Implementations may include one or more of the following features. For example, in updating the key-value delta, the instructions, when executed, may be configured to update the relational delta based thereon, and, in updating the relational delta, the instructions, when executed, may be configured to update the key-value delta based thereon.

The synchronization may include updating the relational store based on the relational delta and on updates received from the key-value store, and thereafter emptying contents of the relational delta. The synchronization may include updating the key-value store based on the key-value delta and on updates received from the relational store, and thereafter emptying contents of the key-value delta.

The synchronization may include updating the pre-calculated results in conjunction therewith, based on the key-value delta and the relational delta. The transaction requests may be received, at a database layer including the database, from at least one application.

The details of one or more implementations are set forth in the accompanying drawings and the description below. Other features will be apparent from the description and drawings, and from the claims.

DETAILED DESCRIPTION

Figure 1:
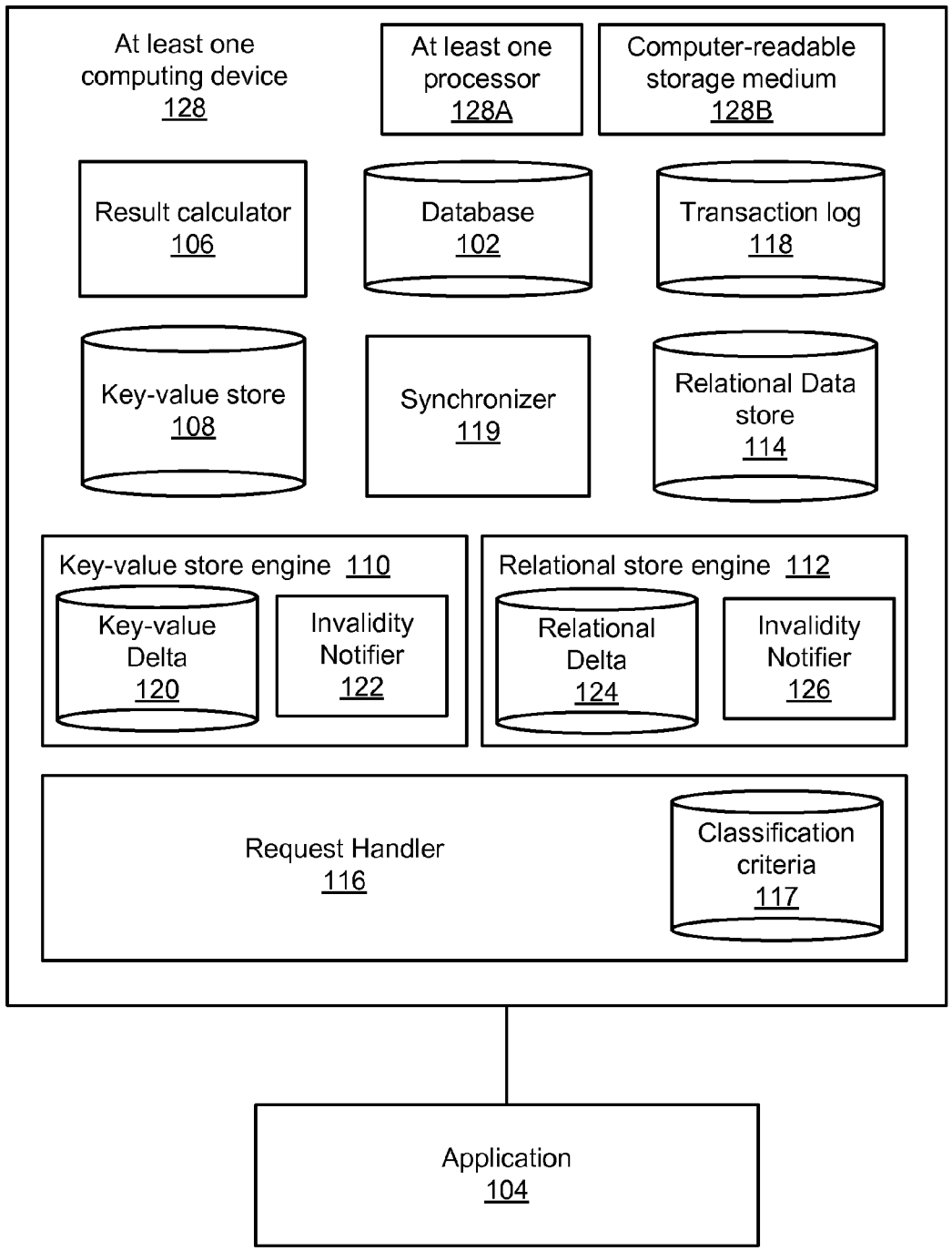
FIG. 1 is a block diagram of a system for handling concurrent database transaction requests.

FIG. 1 is a block diagram of a system 100 for handling concurrent database transaction requests. In the example of FIG. 1, a database 102 is illustrated as supporting transaction requests received from an application 104. As described above, the application 104 may receive a large number of concurrent transaction requests. In the example of FIG. 1, as described in detail below, such concurrent transaction requests are separated at a database layer of the system 100, so that different types of transaction requests are handled differently within the database layer. As a result of these and related features, the transaction requests, as a whole, may be satisfied by the system 100 very quickly and efficiently, even when very large numbers of transaction requests are received within very short periods of time.

In the example of FIG. 1, the database 102 and the application 104 should be understood to represent virtually any type of known or future implementation of architectures in which a front-end application interacts (directly or indirectly) with users (or other sources of transaction requests), including receiving transaction requests requiring the support of one or more back-end databases. For the sake of explanation and example, in the example implementations that follow, the database 102 is generally described as a relational database, such as may store data using one or more related tables, in which individual table rows represent corresponding data records, and individual table columns represent corresponding data types.

Of course, as referenced, the database 102 may represent any type of database compatible with the features and techniques described herein, such as, for example, object-oriented databases. Such databases are generally associated with database management techniques or database management system(s) (DBMS) and associated languages, such as, in the case of relational databases, the Structured Query Language (SQL).

Similarly, the application 104 may represent any application which may access the database 102. Also for the sake of illustration and example, the application 104 may be described herein in terms of internet applications (e.g., e-commerce or social networking applications). For example, the application 104 may represent a business application (e.g., a business application for supply chain management, customer relationship management, or enterprise resource planning), with which employees of the business may access inventory, customer, or financial data records.

Further in FIG. 1, a result calculator 106 may be configured to access the database 102 and to generate contents of a key-value store 108. In the example of FIG. 1, the contents of the key-value store 108 may be stored as key-value pairs, so that a key-value store engine 110 may easily perform a lookup, using a specific key, to quickly and accurately locate an associated value. Moreover, the contents of the key-value store 108 may be stored using one or more appropriate data structures, such as described below with respect to FIG. 5.

Operations of the result calculator 106 in populating the key-value store 108 are described in detail below, e.g., with respect to FIG. 4. Further, operations of the result calculator 106 in the context of updating the key-value store 108 over time during operations of the system 100 are provided below with respect to FIG. 7.

In general, though, the result calculator 106 may be understood to identify specific operations and calculations to be performed utilizing the database 102, in order to prepare the key-value store 108 at a time prior to receipt of a transaction request requiring such results. In so doing, the result calculator 106 may predict transaction requests, or types of transaction requests, that will be received by way of the application 104, and may pre-calculate and store results for such predicted transaction requests as the key-value store 108. For example, the result calculator 106 may predict future receipt of specific transaction requests, or types of transaction requests, based on a frequency or relative frequency of previous receipt of such transaction requests.

Additionally, or alternatively, the result calculator 106 may predict future transaction requests based on characteristics or aspects of the database 102, and/or of the application 104. For example, data stored more recently to the database 102 may be more likely to be included in calculations performed by the result calculator 106 than data which has been included within the database 102 for a predefined minimum of time. In another example, in which the application 104 represents an e-commerce related application, it may occur that certain categories of items for sale are anticipated to be the subject of transaction requests in the near term, so that the result calculator 106 may perform associated calculations using data from the database 102 related to such items for sale.

By way of specific, simplified example, it may occur that the database 102 is an inventory database, and that the application 104 represents an inventory management application. In such settings, it may occur that transaction requests are frequently received which request specific information regarding an item or class of items for sale. For example, such transaction requests may specify a request for a quantity of such items sold within a specific time period, e.g., within a given year. In such scenarios, the result calculator 106 may pre-calculate corresponding results for storage within the key-value store 108, where a specific key may be generated, e.g., using an appropriate hashing algorithm, and which is uniquely identified with transaction results of a specific such example of such transaction requests. Thus, upon receipt by the key-value store engine 110 of a matching transaction request, the key-value store engine 110 may, again using the appropriate hashing algorithm, quickly identify a corresponding key for the requested transaction results, and may thereafter perform a lookup of the desired transaction result within the key-value store 108.

As described in more detail below, many types of common transaction requests received by the application 104 may thus be satisfied through the use of the key-value store engine 110 and the key-value store 108. For example, as just described, transaction requests requesting a simple read of a pre-calculated value may be satisfied extremely quickly. Similarly, a read operation using a simple combination of two or more pre-stored values or results may also be quickly satisfied. Further, simple write operations (e.g., create or insert operations) may be executed using the key-value store engine 110, as also described in more detail below.

Thus, as just described, the key-value store engine 110 and the key-value store 108 may be utilized to quickly and accurately satisfy a large number of transaction requests received by the application 104. Nonetheless, many types of transaction requests may also be received by the application 104, which may be difficult, impractical, or impossible to satisfy using the key-value store engine 110.

Consequently, in the example of FIG. 1, a relational store engine 112 is included in the system 100 of FIG. 1, which may be configured to utilize a relational data store 114 to satisfy such transaction requests that may not be available for satisfaction using the key-value store engine 110 and the key-value store 108. In particular, some of the transaction requests may require logically complex and/or detailed and lengthy calculations to be performed using data of the database 102. In other examples, it may occur that some transaction requests are difficult or impossible to predict in advance of their receipt, so that it may be impractical or impossible for the result calculator 106 to generate relevant results for inclusion within the key-value store 108. Further, it may occur that a volume of data stored using the key-value store 108 may be optimized at a certain size, beyond which pre-calculation of results by the result calculator 106 may provide diminishing or negligible net positive returns.

Thus, the relational data store 114 may represent a reproduced version or subset of the database 102, and may be stored using a same or modified format as the underlying database 102. For example, in scenarios referenced above in which the database 102 represents a relational database of one or more related tables, the relational data store 114 may similarly be stored as one or more related tables, using rows and columns corresponding to the underlying database 102. As a result, the relational store engine 112 may apply virtually any transaction request received from the application 104 that could be applied against the database 102 against the relational data store 114.

In operation, a request handler 116 may be configured to receive the plurality of transaction requests that may be received by way of the application 104. The request handler 116 may consult classification criteria 117 to decide whether to route a particular transaction request to the key-value store engine 110 or the relational store engine 112.

Generally speaking, as described in more detail below, e.g., with respect to FIG. 6, the classification criteria 117 may classify any incoming transaction request as either simple or complex, whereas simple transaction requests may be sent to the key-value store engine 110, while the more complex transaction requests may be sent to the relational store engine 112. For example, in the most straightforward scenarios, simple transaction requests maybe identified as those which request only a query/read operation, and/or perhaps a basic write operation (e.g., a create or insert operation). Meanwhile, complex transaction requests may be defined as those transaction requests which require more extensive calculations and/or manipulations with respect to data contained within the underlying database 102, as such data is represented within the relational data store 114.

Put another way, as may be appreciated from the above discussion of the key-value store 108 and the relational data store 114, simple transaction requests identified by the classification criteria may be understood to be those transaction requests which are likely to be included within the key-value store 108, while complex transaction requests may be identified as those which may require access to the relational data store 114 to be completed successfully. As such, configuration of the classification criteria 117 may depend upon an underlying set of operations of the result calculator 106 in calculating the contents of the key-value store 108. For example, if the result calculator 106 is configured to include certain types of data within the key-value store 108, then transaction requests that may be related to such data may be more likely to be classified by the classification criteria 117 as simple transaction requests to be sent to the key-value store engine 110. Thus, certain operations of the request handler 116 in classifying the incoming transaction requests for routing to the key-value store engine 110 or the relational store engine 112 may be understood to be at least partially a matter of design configuration on the part of a user of the system 100 of FIG. 1.

Thus, as described in more detail below, e.g., with respect to FIGS. 3, 6, 7, the request handler 116 may receive a given transaction request, and, based on the classification criteria 117, may route the received transaction request to the key-value store engine 110 for satisfaction thereof using the key-value store 108. As just referenced, the classification criteria 117 may have access to operations of the results calculator 106 and/or to the key-value store 108, so that the request handler 116 may have a high expectation or certainty of satisfaction of the transaction request by the key-value store engine 110. However, it also may occur that the request handler 116 routes a transaction request to the key-value store engine 110 that, for reasons discussed herein, may not be satisfied through the use of the key-value store 108. In such cases, the key-value store engine 110 and/or the request handler 116 may be configured to further route such a transaction request to the relational store engine 112.

Additionally, as referenced above, the request handler 116 also may receive a second transaction request which, based on the classification criteria 117, may be routed to the relational store engine 112. Thereafter, the relational store engine 112 may satisfy the routed transaction request, using the relational data store 114.

As described in more detail below with respect to FIG. 2, operations of the key-value store engine 110 and the relational store engine 112 may be executed using main memory, in order to increase an overall an efficiency of the system 100. However, generally speaking, main memory is implemented using volatile storage mediums, so that a crash or other disruption of hardware or software used to implement the system 100 might result in an undesired loss of data. Consequently, as also described below with respect to FIG. 2, the database 102 itself may be stored using an underlying non-volatile storage medium. Then, a transaction log 118 may be kept which reflects all data transactions executed in the context of the volatile storage medium of the main memory. Consequently, the database 102 may be updated as needed/desired, using the transaction log 118. Then, in the case of a hardware/software crash or other system disruption, data of the database 102 will not be lost, and may be updated up to a point in time of the crash or other disruption, using the transaction log 118. As a result, the system 100 in general, including the relational data store 114 and the key-value store 108, may be recreated and brought current to a point in time of the crash or other disruption.

As may be appreciated from the above description, and as described in more detail below, transaction requests executed by the key-value store engine 110 may cause a change in content of the key-value store 108. Similarly, transaction requests executed by the relational store engine 112 may result in changes to content of the relational data store 114. For example, a transaction request received by the request handler 116 and routed to the key-value store engine 110 may cause a change to a given data record of the key-value store 108. Subsequently, a following transaction request that is related to the same data record, and that is received by the request handler 116 and routed to the key-value store engine 110, must reflect the updated value of the data record in question, in order to provide a current and accurate response to the application 104.

Similarly, later-received transaction requests processed by the relational store engine 112 must reflect earlier-updates to the relational data store 114, caused by earlier-received transaction requests that were processed by the relational store engine 112. Further, but similarly, transaction requests received by the relational store engine 112 must also be processed in a manner that considers updates to data records caused by the key-value store engine 110 in the context of the key-value store 108. Similarly, but conversely, transaction requests processed by the key-value store engine 110 must reflect earlier changes made to the relational data store 114 as a result of processing of earlier transaction requests by the relational store engine 112.

Thus, as illustrated in the example of FIG. 1, a synchronizer 119 may be configured to interact with the key-value store engine 110 and the relational store engine 112, in order to thereby ensure a desired timing and level of synchronicity between the key-value store 108 and the relational data store 114. For example, the synchronizer 119 may be configured to execute, at defined time intervals, full synchronizations between the key-value store 108 and the relational data store 114, so as to thereby reflect and include any and all data modifications necessary to reflect all transaction requests executed since a completion of an immediately-preceding synchronization operation. Additionally, or alternatively, the synchronizer 119 may be configured to execute such synchronizations in response to a request or other operation of the key-value store engine 110 and/or the relational store engine 112. For example, the synchronizer 119 may process a synchronization after a certain number of transaction requests have been handled, and/or in association with the processing of a particular transaction request or type of transaction request that may imply or require such synchronization.

In order to facilitate operations with the synchronizer 119, and generally to ensure the providing of current, accurate results to transaction requests received from the application 104, the key-value store engine 110 may include a key-value delta 120, which is configured to track any changes to the key-value store 108 which may result due to processing of transaction requests by the key-value store engine 110. For example, a transaction request processed by the key-value store engine 110 may result in the insertion of a new data record within the key-value store 108. Rather than modify contents of the key-value store 108 at that time (or the contents of the relational data store 114 or the database 102), the key-value store engine 110 may simply store the created data record using the key-value delta 120.

Similarly, a transaction request to delete a result within the key-value store 108 may be reflected within the key-value delta 120. Specifically, in the latter example, it is not necessary to actually delete the specified data record from the key-value store 108. Rather, the deleted data record may simply be flagged as invalid, using the key-value delta 120. Then, as referenced above, it is necessary to ensure that the relational store engine 112 does not thereafter utilize or attempt to access the thus-deleted data record. Consequently, an invalidity notifier 122 of the key-value store engine 110 may be configured to notify the relational store engine 112 of the deletion/invalidity of the data record in question. More specifically, as described in detail below, e.g., with respect to FIG. 6, the invalidity notifier 122 may configured to notify the relational store engine 112 of any update to the key-value delta 120 that might possibly impact operations of the relational store engine 112 in utilizing the relational data store 114 to provide current, accurate responses to transaction requests received from the application 104 by way of the request handler 116.

Similarly, the relational store engine 112 may maintain a relational delta 124, which reflects any updates to the relational store 114 caused by processing of a transaction request by the relational store engine 112, and that have not yet been reflected within the relational data store 114 by operations of the synchronizer 119. Also similarly to operations of the invalidity notifier 122, the relational store engine 112 may include an invalidity notifier 126, which also may be configured to send notifications of invalidity of particular data to the key-value store engine 110, so as to thereby ensure that the key value store engine 110 does not provide inaccurate or out-of-date responses to transaction requests received from the application by way of the request handler 116.

Thus, in operation, the key-value store engine 110 may satisfy transaction requests from the request handler 116 using the key-value store 108, and thereafter update the key-value delta 120 to reflect any resulting changes to the key-value store 108. If needed, the invalidity notifier 122 may notify the relational store engine 112 of such a change, to be thereafter reflected within the relational data 124. The relational store engine 112 may thus utilize the relational delta 124 to satisfy subsequent requests received from the request handler 116, and using the relational data store 114. Similar comments may apply to the relational store engine 112, i.e., transaction requests may be processed using the relational data store 114, and any resulting changes thereto may be reflected within the relational delta 124, in full, in whole or in part by the invalidity notifier 126 to the key-value store engine 110.

As also described below, e.g., with respect to FIG. 6, operations of the invalidity notifiers 122, 126 may vary somewhat, as a matter of design choice. For example, in some implementations, the invalidity notifier 122 may, upon updating of the key-value delta 120, notify the relational delta 124 of the update in question, and may thereby cause an actual update to a corresponding data record within the relational delta 124, to thereby reflect the underlying update to the key-value delta 120.

In other example implementations, however, the invalidity notifier 122 may simply identify the relevant, modified data of the key-value delta 120 and/or the key-value store 108, so that the relational delta 124 may simply track the fact that the identified data has been changed, without actually being made aware of the updated value thereof at that time. In the latter examples, upon receipt by the relational store engine 112 of a transaction request which is associated with the invalid/modified data identified within the relational delta 124 by the invalidity notifier 122, the relational store engine 112 may trigger the synchronizer 119 to partially or completely synchronize the key-value store 108 and the relational data store 114, using the respective key-value delta 120 and relational delta 124. In such examples, then, it may be appreciated that operations of the synchronizer 119 may potentially be triggered by a certain type or quantity of notifications sent by either or both of the invalidity notifiers 122, 126.

Thus, the key-value store engine 110 and the relational store engine 112 are capable of providing fast and accurate responses in a specialized, efficient manner, which enables handling of a large number of concurrent transaction requests received by way of the application 104. While doing so, the key-value store engine 110 and the relational store engine 112 may track changes to the key-value store 108 and the relational data store 114, respectively, using the key-value delta 120 and the relational delta 124, also respectively. After a certain period of time, and/or in response to some other stimulus, the synchronizer 119 may update the relational data store 114 and the key-value store 108, at which time it may be desirable or required to erase some or all of the key-value delta 120 and/or the relational delta 124. As may be appreciated, and as also described in detail below, operations of the synchronizer 119 in this regard may be facilitate by the earlier operations of the invalidity notifiers 122, 126 in identifying specific data to be included in the synchronization operations of the synchronizer 119. Moreover, since all of the components 108-119 may be implemented in main memory, the operations thereof in satisfying the transaction request received the application 104 may be very fast and efficient, even in the presence of a large number of concurrent transaction requests.

As illustrated in FIG. 1, the system 100 may be implemented using at least one computing device 128, which may itself include at least one processor 128A and at least one compute readable storage medium 128B. That is, for example, the system 100 may be implemented using two or more computing devices 128, in communications with one another in operating partially or completely and parallel. Similarly, two or more processors may be utilized, executing in parallel, so as to increase a speed and efficiency of operations of the system 100.

As referenced above, and as described and illustrated in more detail below with respect to FIG. 2, the computer readable storage medium 128B may represent at least two different types of computer memory. For example, the computer readable storage medium 128B may represent a first, non-volatile memory that is used to store the database 102 in the transaction log 118. Meanwhile, the compute readable storage medium 128B also may generally represent a second, volatile memory, provided as main memory of the at least one computing device 128. As also described and illustrated with respect to FIG. 2, such main memory may be utilized to implement and execute any of the components 108-119 of the system 100 of FIG. 1.

Although the system 100 of FIG. 1 is illustrated using a plurality of discrete, individual modules, it may be appreciated that such illustration is merely for the sake of example and describing operations of the system 100. Consequently, it may also be appreciated that any two or more components of the system 100 may be combined for execution as a single component. Similarly, but conversely, any single component illustrated in the system 100 of FIG. 1 may be broken into two or more subcomponents in various example implementations. For example, some or all of the synchronizer 119 may be split and included within corresponding portions of the key-value store engine 110 and the relational store engine 112. By way of another example, some functions of the request handler 116 may be included within operations of the key-value store engine 110, since, for example, as referenced above, transaction requests routed through the key-value store engine 110 may not be able to be satisfied using the key-value store 108, and must thereafter through the relational store engine 112 for satisfaction thereof using the relational data store 114.

Figure 2:
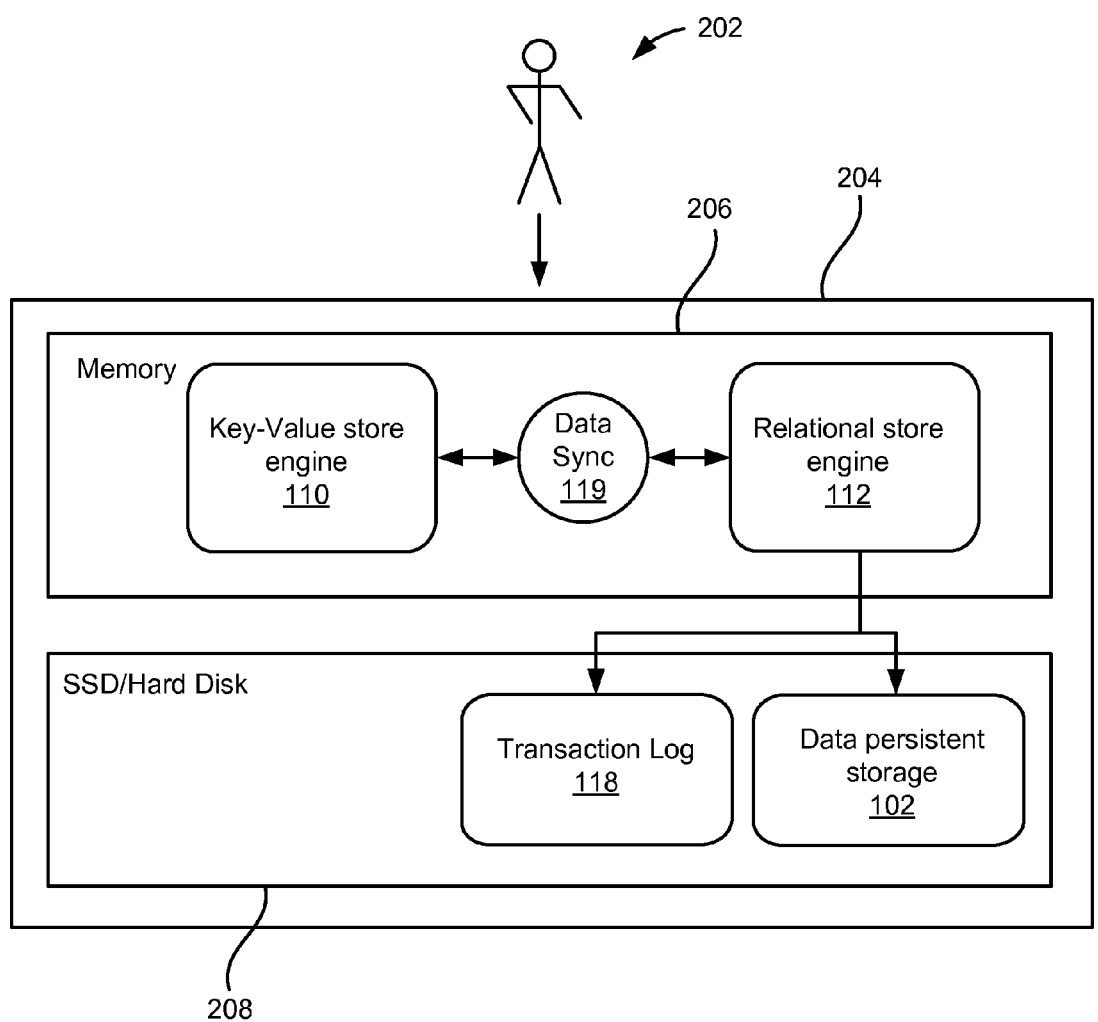
FIG. 2 is a block diagram illustrating example implementation details of the system of FIG. 1.

FIG. 2 is a block diagram illustrating an example use of different types of memory during implementations of the system 100 of FIG. 1. In the example of FIG. 2, a user 202 (representing one or more users) is illustrated as providing transaction requests to a database system 204. As shown, a memory 206 represents an example of volatile, main memory that is used to implement the key-value store engine 110, the relational store engine 112, and the synchronizer 119. Of course, although not specifically illustrated in the example of FIG. 2 for the sake of simplicity, it may be appreciated that various internal and related components of the key-value store engine 110, the relational store engine 112, and the synchronizer 119 (including the key-value store 108 and the relational data store 114) may also be implemented using the memory 206.

Meanwhile, a second memory 208 is illustrated as being used to implement the transaction log 118 and the underlying database 102. As shown, the memory 208 may include, for example, non-volatile memory, such as a hard disk or solid-state drive (SSD).

Thus, as described, operations of the key-value store engine 110, the relational store engine 112, and the synchronizer 119 may be executed in a fast, efficient manner, using the memory 206. In order to guard against the inherent instability of the memory 206, as shown and described, the relational store engine 112 may continuously update the transaction log 118, so as to reflect all the transactions executed using the memory 206. Consequently, in the event of a system crash or other fault, the current state of the system at the time of the disruption may be reproduced, using only the contents of the transaction log 118 and the database 102.

Further, in practice, the transaction log 118 may be updated continuously, as just referenced, but it may not be necessary or desirable to reflect such changes synchronously within the database 102. Rather, the transaction log 118 may collect transactions over a period of time, and/or up to a certain threshold number of transactions, whereupon synchronization of the transaction log 118 and the database 102 may occur, and contents of the transaction log 118 may be cleared.

Figure 3:
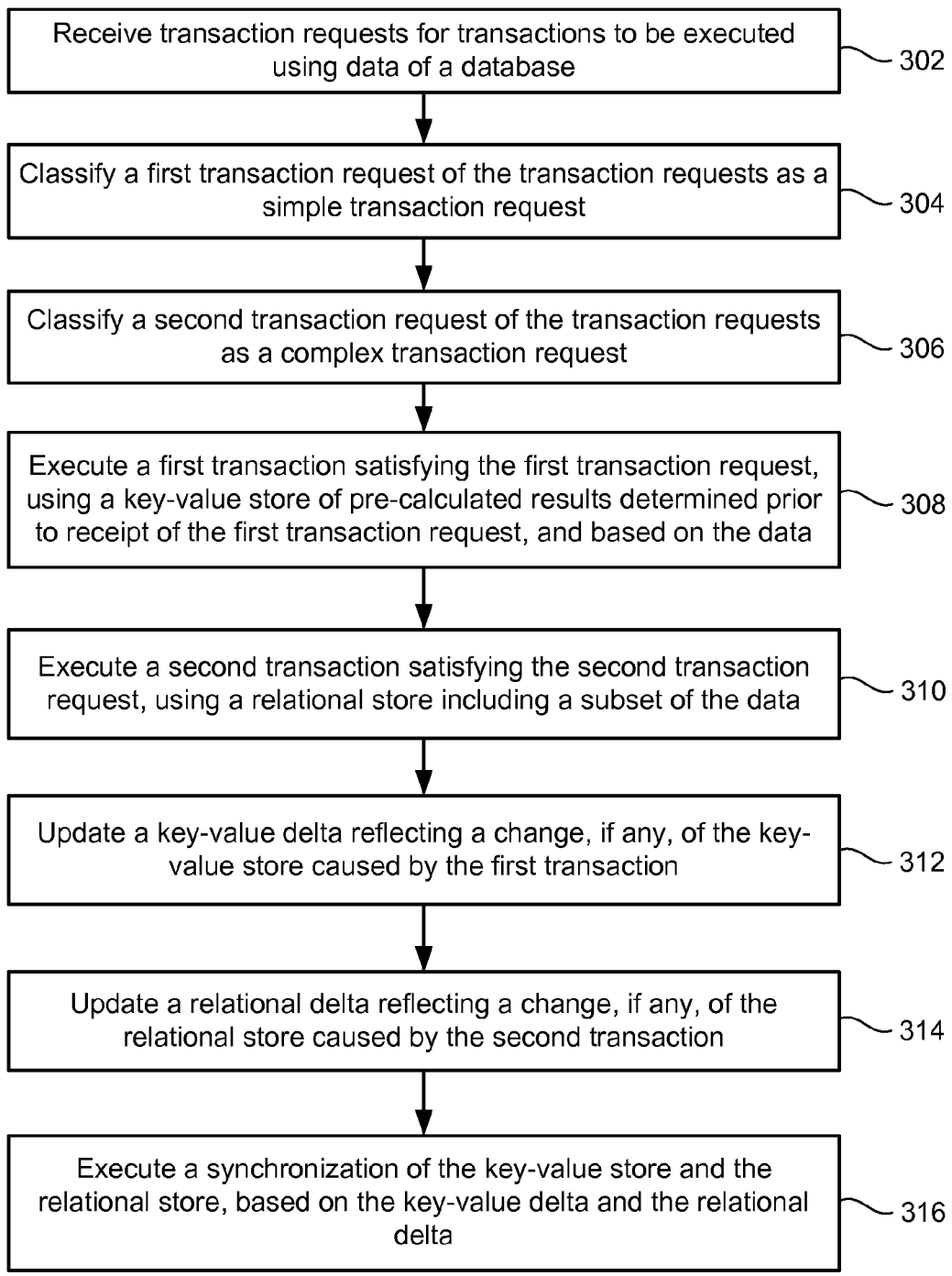
FIG. 3 is a flow chart illustrating example operations of the systems of FIGS. 1, 2.

FIG. 3 is a flowchart 300 illustrating example operations of the system 100 of FIG. 1. In the example of FIG. 3, operations 302-316 are illustrated as separate, sequential operations. However, it may be appreciated that any two or more of the operations 302-316 may be implemented in a partially or completely overlapping or parallel manner, and/or in a nested, iterative, branched, or looped manner. Moreover, within such variations, it may be appreciated that additional or alternative operations, not specifically illustrated in the example of FIG. 3, may be included, while one or more of the operations 302-316 also may be omitted.

In the example of FIG. 3, as referenced above, transaction requests for transactions to be executed using data of a database may be received (302). For example, the request handler 116 may receive transaction requests by way of the application 104, e.g., as a result of interactions of the application 104 with the user 202 of FIG. 2.

A first transaction request of the transaction requests may be classified as a simple transaction request (304). For example, as described, the request handler 116 may consult the classification criteria 117 to determine that the first transaction request is likely or necessarily satisfied using contents of the key-value store 108. As described, such classification may be based on actual knowledge of the key-value store 108, and/or may be based on a nature and type of the first transaction request. For example, as described, any transaction request which is a straightforward create/read/update/delete as specified data likely to be included within key-value store 108 may be classified as simple transaction requests.

Meanwhile, a second transaction request of the transaction requests may be classified as a complex transaction request (306). For example, the request handler 116 may determine, based on the classification criteria 117, that the second transaction request requires a logical combination of two or more data records or data tables, or may otherwise require computationally-intensive calculations that are unlikely or incapable of being satisfied using the key-value store 108. In particular, for example, any such transaction request which is likely to require that one or more rows of data (or entire tables of data) are locked, until completion of the second transaction request, will be likely to be classified as complex Further in FIG. 3, a first transaction satisfying the first transaction request may be executed, using a key value store of pre-calculated results determined prior to receipt of the first transaction request and based on the data (308). For example, the key-value store engine 110 may satisfy the first transaction request using the key-value store 108, where, as described, the key contents of the key-value store 108 may have been previously calculated by the result calculator 106, using data stored in the database 102 (and/or in the relational data store 114).

A second transaction satisfying the second transaction request may be executed, using a relational store including a subset of the data (310). For example, the relational store engine 112 may satisfy the second transaction request, using the relational data store 114.

A key value delta reflecting a change, if any, of the key-value store caused by the first transaction may be updated (312). For example, the key-value store engine 110 may update the key-value delta 120, based on any change to the key-value store 108 resulting from execution of the first transaction request.

Similarly, a relational delta reflecting a change, if any, of the relational store caused by the second transaction may be updated (314). For example, the relational store engine 112 may update the relational delta 124, based on execution of the second transaction using the relational data store 114.

Finally in the example of FIG. 3, a synchronization of the key-value store and the relational store may be executed, based on the key value delta and the relational delta (316). For example, the synchronizer 119 may update the relational data store 114 using the key-value delta 120 and the relational delta 124. Similarly, the synchronizer 119 may update the key-value store 108, using the key-value delta 120, the relational delta 124, and the result calculator 106 (to the extent necessary to re-calculate results to be stored within the key-value store 108, as described in more detail below with respect to FIG. 7).

Figure 4:
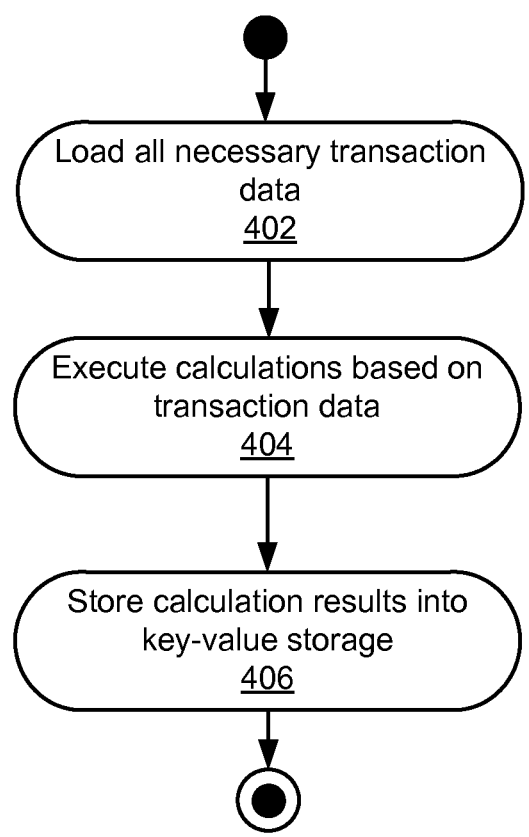
FIG. 4 is a flowchart illustrating example pre-request calculation results used in the system of FIG. 1.

FIG. 4 is a flowchart 400 illustrating example operations of the result calculator 106 of FIG. 1. That is, the flowchart 400 illustrates, for example, operations of the result calculator 106 that may be executed to populate the key-value store 108, in anticipation of receipt of future transaction requests that may be satisfied thereby.

In the example of FIG. 4, all necessary transaction data may be loaded by the result calculator 106 (402). For example, the result calculator 106 may access the database 102, in order to utilize data that is anticipated to be the subject of a large number or percentage of future transaction requests. For example, the result calculator 106 may analyze the transaction log 118 to determine relative frequencies of transaction requests or types of transaction requests, and may extrapolate therefrom to determine which data or types of data to extract from the database 102.

Similarly, the result calculator 106 may determine the types of calculations to be performed on the extracted data, and may thereafter execute calculations based thereon (404). Moreover, over time, the result calculator 106 may monitor usage of the key-value store 108 during operations of the system 100, so as to thereby judge the relative success of the selections of the data and associated calculations performed during population of the key-value store 108. Thus, for example, during future updates of the key-value store 108, the result calculator 106 may be more likely to select data and associated calculations that have been frequently utilized by the key-value store engine 110 during execution of transaction requests based on the key-value store 108.

Figure 5:
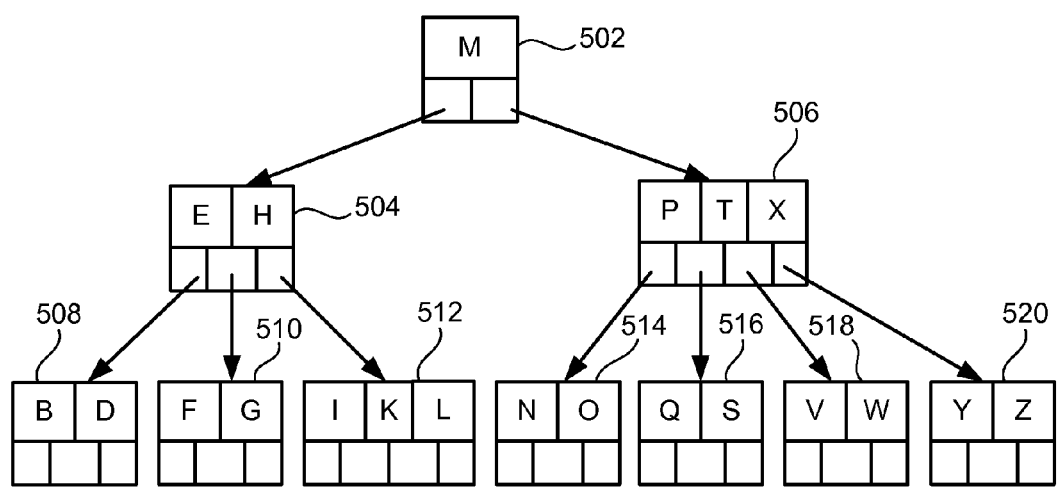
FIG. 5 is a block diagram of a B-tree data structure used in an example implementation of the system of FIG. 1.

Finally in FIG. 4, the calculation results may be stored using the key-value store 108 (406). In example implementations, the calculation results may be stored in a manner which enables fast, accurate lookup of desired results within the key-value store 108 by the key-value store engine 110. Specifically, for example, FIG. 5 illustrates a B-tree data structure that may be utilized to populate the contents of the key-value store 108. As shown, the B-tree data structure of FIG. 5 includes a number of nodes 502-520, arranged in a hierarchical fashion. Consequently, lookup of any particular data items from within the data structure of FIG. 5 may occur rapidly, because the distributed nature of the data structure implies that accessing any particular data item should require traversal, at most, of a relatively small number of levels of the hierarchical data structure.

More specifically, as shown, each node may include multiple keys and associated data items, each of which may be further associated with a node and associated key/data items at a next-lower level of the data structure. Consequently, even if an overall data volume of the data structure of FIG. 5 increases significantly, the depth of the data structure hierarchy will not increase proportionally, so that any specific key search implemented to locate a particular value need only access a relatively small number of hierarchical levels to locate the desired value.

In example implementations, the result calculator 106 may utilize a suitable hash algorithm to populate the key-value store 108, so that the key-value store engine 110 may utilize the same hash algorithm to access desired values from the key-value store 108. In such scenarios, as described in more detail below with respect to FIG. 8, the result calculator 106 may utilize the hash algorithm to implement the data structure of FIG. 5 using a plurality of different computing devices. Consequently, the data volume in any given one of such computing devices may be limited to acceptable or desired levels. Moreover, many separate transaction requests may be executed simultaneously, so that the calculational load may be distributed among the different computing devices in parallel.

During access of the key-value store 108 by the key-value store engine 110, the key-value store engine 110 would simply need to find a relevant node related to a particular transaction request, e.g., using the appropriate hash algorithm. Then, the key-value store engine 110 would simply need to override, add, or remove the corresponding node, depending on the underlying nature of the transaction request in question. When the key-value store 108 is implemented using main memory, as illustrated in the example of FIG. 2, then available memory space may be pre-allocated for implementation of the key-value store 108, e.g., using a memory pool. Further, access of the key-value store 108 in such example implementations may be executed as a direct memory access, without requiring resources at the level of an underlying operating system.

Further, many different variations and optimizations may be implemented in the use of the data structure of FIG. 5 in the context of the key-value store 108. For example, as referenced above, the result calculator 106 may be configured to populate the key-value store 108 using pre-calculated results that are considered likely to be accessed frequently by incoming transaction requests. However, nonetheless, it may occur that at least some of the data of the key-value store 108 is not accessed very frequently. Consequently, in order to conserve data requirements of the key-value store 108, such B-tree nodes of the data structure of FIG. 5 that are not commonly or frequently accessed may be relocated for storage using the relational data store 114 and/or the underlying database 102. In more specific examples, the key-value store engine 110 may monitor a hit rate of each node of the B-tree of FIG. 5, and, over time, may determine which such nodes are utilized relatively and frequently. Then, such nodes may be moved to the relational data store 114, perhaps in conjunction with synchronization operations of the synchronizer 119. Then, as described, such updates to the relational data store 114 may be logged using the transaction log 118, and ultimately reflected within the database 102.

Figure 6:
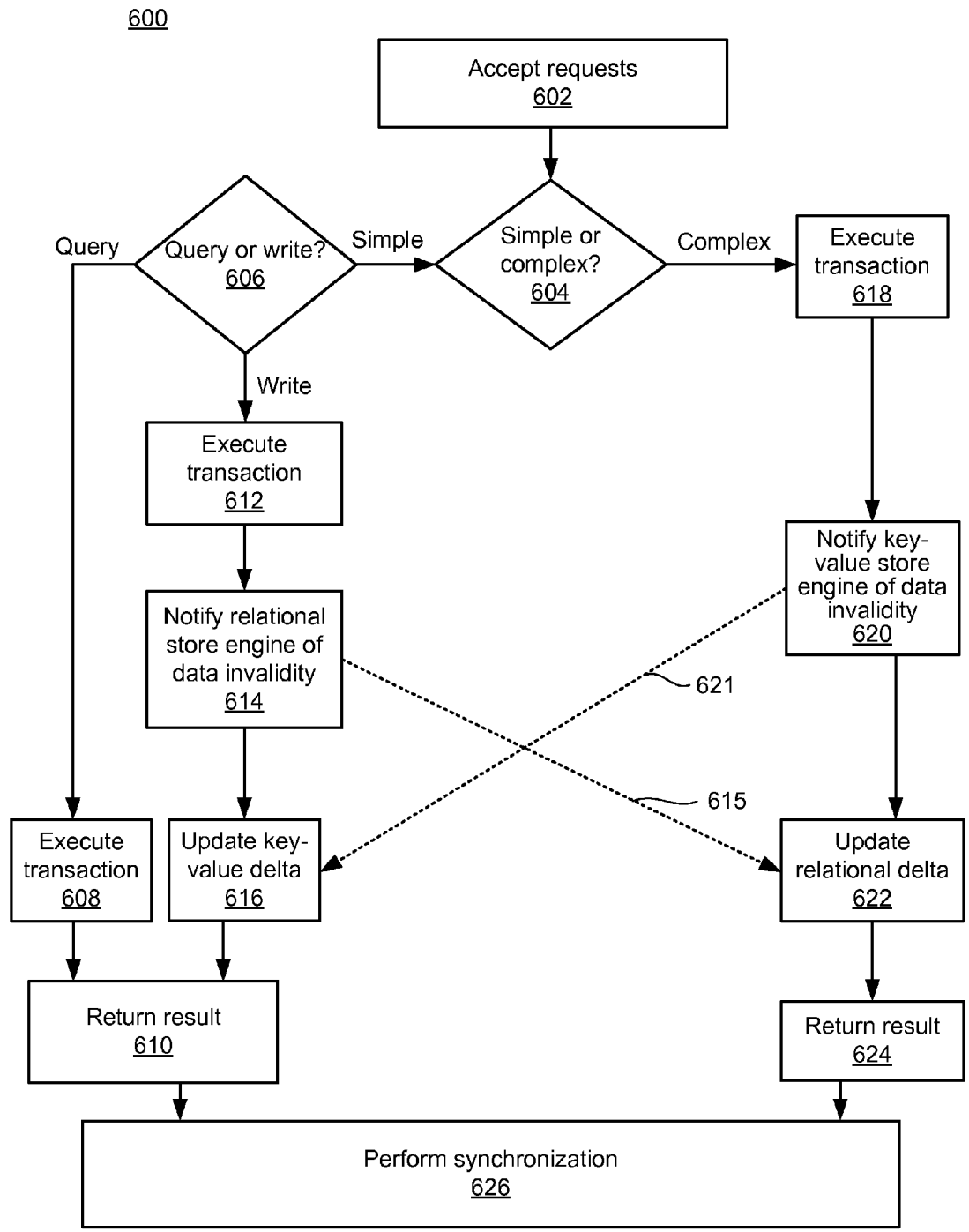
FIG. 6 is a flowchart illustrating additional example operations of the systems of FIGS. 1, 2.

FIG. 6 is a flowchart 600 illustrating more detailed example operations of the systems of FIGS. 1 and 2. In the example of FIG. 6, transaction requests may be accepted (602). For example, as described, the request handler 116 may receive transaction requests from the application 104, for classification thereof as simple or complex transaction requests (604), based on the classification criteria 117. In additional or alternative example implementations, however, the request handler 116, or functions thereof, may be implemented within or by the key-value store engine 110. For example, it may occur that all transaction requests are initially routed to the key-value store engine 110, which may then determine whether such transaction requests are likely to be satisfied using the key-value store 108. If not, then the transaction request may be routed to the relational store engine 114.

In the example of FIG. 6, however, once classification of the accepted transaction request occurs (604), then transaction requests determined to be classified as simple transaction requests may be further classified as query or write transactions (606). If the transaction request is a query operation, then the underlying transaction may be executed (608) by the key-value store engine 110, using the key-value store 108.

By way of specific example, such a transaction request may request a read operation specifying output of all instances of items of a certain type. Then, transaction execution may involve simply accessing the key-value store 108 to retrieve the instances therefrom. Additionally, as referenced above, the key-value store engine 110 may check the key-value delta 120, so as to determine whether any preceding updates thereto are required to be reflected within the results being calculated for the current transaction request.

For example, it may occur that during a preceding transaction executed by the key-value store engine 110 using the key-value store 108, an additional instance of the specified item type was created or inserted. Consequently, the key-value store engine 110 would update the results of the transaction request to include the additional instance from the key-value delta 120. More generally, then, it may be appreciated that the key-value store engine 110 may initially execute any such query operations that may be satisfied using the key-value store 108, and may thereafter update such results based on contents of the key-value delta 120.

In some cases, it may occur that the requested transaction may not be executed using the key-value store 108. For example, it may occur that there is no corresponding key and associated value contained within the data structure of FIG. 5. For example, as described, it may have occurred that the required data values were previously moved to the relational store 114, or were never included within the key-value store 108 by the result calculator 106. In such cases, as described herein, the failed transaction request may be forwarded to the relational store engine 112 for execution thereby (e.g., as described below with respect to operation 618). However, if the transaction has been successfully executed (608), then the corresponding result may be returned (610), e.g., to the application 104 and/or the user 202.

Meanwhile, if the original transaction request was determined to be a write operation (606), then again execution of the underlying transaction may be attempted by the key-value store engine 110, using the key-value store 108 (612). As described above with respect to operation 608, such transaction execution may include consultation of the key-value store 108 in conjunction with consideration of the key-value delta 120, so as to thereby obtain a current, accurate result. Moreover, as also described with respect to operation 608, failure to execute the transaction by the key-value store engine 110 may result in forwarding of the transaction request to the relational store engine 112, for execution thereby (e.g., in the context of the operation 618, as described below).

In such examples in which the key-value store engine 110 executes write operations with respect to contents of the key-value store 108, it may be appreciated that such transactions will result in changes to the content of the key-value store 108, and/or to the underlying data from which the contents of the key-value store 108 was determined. Consequently, as referenced above with respect to FIG. 1, the invalidity notifier 122 of the key-value store engine 110 may provide notification to the relational store engine 112 that previous versions of relevant data are no longer valid or current (arrow 615), in order to ensure that the relational store engine 112 does not attempt to process transaction requests using such outdated or invalid data.

As referenced, in some example implementations, the invalidity notifier 122 may simply notify the relational store engine 112 of the data invalidity, without requiring a corresponding immediate update to contents of the relational delta 124. For example, in a case where contents of a particular data record has been updated, the invalidity notifier 122 may simply notify the relational delta 124 that the corresponding data record should not be used until a future synchronization process has been executed. As long as the relational store engine 112 does not require the data record in question in order to satisfy a transaction request, such invalidity notifications may accumulate. Then, after a certain amount of time, or after a certain number of invalidity notifications and/or transaction requests, the relational delta 124 may be updated to reflect the actual content changes indicated by the invalidity notifier 122, through the use of the synchronizer 119.

In additional or alternative implementations, the relational store engine 112 may perform updates of the relational delta 124 using only a relevant subset of invalidity notifications received from the invalidity notifier 122. For example, the relational store engine 112 may receive transaction requests which require data specified by the invalidity notifier 122 as being invalid, and may thereafter require immediate updates to the relational delta 124 for at least those data items that are required to provide current, accurate results for the transaction requests in question.

Further, operations of the relational store engine 112 in updating the relational data 124 based on notifications received from the invalidity notifier 122 may vary based on other factors. For example, such updating processes may vary based on a type of invalidity notification received. For example, in a case where the invalidity notification indicate deletion of a specific data record from the key-value store 108, the relational store engine 112 may simply need to associate the related data record as being unavailable within the relational delta 124, and there may be no need to actually delete the relevant data record from the relational delta 124 at all, until such time as a full synchronization of the key-value store 108 and the relational data store 114 is performed by the synchronizer 119. On the other hand, in examples in which new data is created, inserted, or otherwise added to the key-value delta 120, it may be necessary for the relational delta 124 to be updated accordingly, using one or more of the techniques described, in order to provide fast, accurate results to related transaction requests.

In conjunction with notifying the relational store engine of data invalidity resulting from transaction execution of the current write request (614), the key-value store engine 110 may also update the key-value delta 120 itself. For example, as may be appreciated, in cases in which data is deleted from the key-value store 108, corresponding updates to the key-value delta 120 may be executed (616). For example, mirror images of an affected data record may be included within the key-value delta 120, and either marked as deleted/invalid, or changed to reflect the underlying write operation included within the executed transaction.

Thus, in conjunction with the updating of the key-value delta 120 (616), the transaction result may be returned (610). As shown, requests may thereafter continue to be accepted (602), so that subsequent transaction requests classified as simple (604) may continue to be processed in the manner just described, including utilizing any updates to the key-value delta 120 having been made in the context of previously-executed transactions.

Meanwhile, transaction requests classified as complex (604) by the request handler 116 may be forwarded to the relational store engine 112, whereupon the transaction may be executed (618). In executing the transaction, it may be appreciated that the relational store engine 112 is configured to utilize the relational delta 124 in conjunction with the relational data store 114, in order to ensure that results of the executed transaction are current and accurate (in particular, as described above, the relational delta 124 should reflect at least an indication of invalidity of related data required for processing a current transaction request, as referenced and illustrated above with respect to the arrow 615). In any case, as described, the relational store engine 112 may be ensured of providing fast and accurate results in conjunction with executing the transaction, by ensuring that at least the required portions of the relational delta 124 necessary for processing the transaction request are current, and considered in conjunction with related data obtained from the relational data store 114.

By nature of classification of the transaction request received at the relational store engine 112, it is extremely likely if not necessary that the execution of the associated transaction (618) will result in updates or other changes to the relational data store 114. Consequently, the invalidity notifier 126, similarly to the invalidity notifier 122, may proceed to notify the key-value store engine 110 of invalidity of data affected by the executed transaction (620). Specifically, as illustrated by an arrow 621, the invalidity notifier 126 may send an invalidity notification to the key-value delta 120. As described above with respect to the invalidity notifier 122, such notifications may provide only enough information to prevent the key-value store engine 110 from incorrectly using outdated data. Thereafter, partial or complete synchronizations of the key-value delta 120 and the key-value store 108 may be executed, so as to also ensure that any subsequent results returned by the key value store engine (e.g., in operation 610) are current and accurate.

As may be appreciated by a nature of the key-value store 108, such updates to the key-value delta 120 (616) may ultimately rely on operations of the result calculator 106 to provide the key-value store engine 110 with current, accurate data to be used in processing transaction requests. For example, as described, the result calculator 106 may populate the key-value store 108, including executing certain calculations based on underlying data of the database 102 and/or the relational data store 114. When such underlying data is changed, e.g., as a result of operations of the relational store engine 112 in processing transaction requests, then calculations based on such altered data must also be update in order to provide current, accurate results. Such updates may be executed as part of one or more synchronization processes, as described herein, specifically, operations of the results calculator 106 in updating the key-value delta 120 are described in detail below, with respect to FIG. 7.

Then, in conjunction with the notification of the key-value store engine 110 of relevant data invalidity (620), the relational store engine 112 may proceed to update the relational delta 124 (622). Then, the transaction result may be returned to the application 104/user 102 (624), and thereafter requests may continue to be accepted (602).

Thus, the operation 602-624 of the flowchart 600 illustrate that the system 100 of FIG. 1 may receive and process large numbers of concurrently-received transaction requests, in a manner that is highly fast and efficient, while ensuring high levels of completeness and accuracy. Over time, during such operations, it may be understood that contents of the key value 120 and the relational delta 124 may grow and accumulate to undesirable levels of data volume. For example, notices of data invalidity may accumulate within either or both of the key-value delta 120 and/or the relational delta 124. More generally, a total size of the key-value delta 120 and/or the relational delta 124 may grow undesirably large. In such cases, the above-described benefits of maintaining and using the key-value delta 120 and relational delta 124 may be partially or completely offset, in that computational resources required to maintain and use the key-value delta 120 and the relational delta 124 may eventually outweigh the above-described benefits.

Consequently, it may be necessary or desirable to perform one or more synchronization processes (626). In this regard, it may be appreciated that there are at least three different types of synchronization processes referenced above, which may implemented on different time scales and/or in response to different triggering events.

For example, one type of synchronization that may be performed includes the updating of one or both of the key-value delta 120 and the relational delta 124, so as to update data contained therein which has been designated as invalid as a result of earlier-received invalidity notifications from the invalidity notifiers 122, 126. As described, such synchronizations may occur relatively frequently, and may occur as synchronizations of only those parts of the data marked invalid which are required for current or predicted transaction requests.

A second type of synchronization refers to synchronization of the key-value delta 120 and the relational delta 124 with the key-value store 108 and the relational data store 114. During such synchronizations, all changes made to data and reflected within one or both of the key-value delta 120 and the relational delta 124 may be reflected through corresponding modifications of the key-value store 108 and the relational data store 114. Consequently, at a completion of such a synchronization process, contents of the key-value store 108 and the relational data store 114 will at least temporarily be consistent with one another, and the key-value delta 120 and the relational delta 124 may themselves be at least temporarily empty.

For a third type of synchronization, as also referenced above, all transactions conducted by the relational store engine 112 may be reflected in the transaction log 118. Consequently, during the third type of synchronization process, the database 102 may be updated to reflect all such tracked transactions and associated data. Consequently, the transaction log 118 may also be temporarily empty, until new transactions are received. In some embodiments, contents of the transaction log 118 may be maintained for longer-term use by the results calculator 106 in determining whether and how to calculate certain results for inclusion within the key-value store 108.

As may be appreciated, the synchronizer 119 may be configured to facilitate such synchronizations, in conjunction with the key-value store engine 110 and/or the relational store engine 112. In general, operations of the synchronizer 119 may be classified as forward or reverse synchronizations. For example, forward synchronizations may refer to synchronizations resulting from transactions processed by the key-value store engine 110, which are reflected in the key value delta 124, and thereafter propagated to the relational delta 124, and thus to the relational data store 114 and, thereafter, the transaction log 118.

In contrast, reverse synchronizations may be understood to refer to synchronizations executed by the synchronizer 119 as a result of the transactions executed by the relational store engine 112. That is, as referenced above and described in detail below with respect to FIG. 7, transaction requests received at the relational store engine 112 for execution thereby will generally require updates to the key-value delta 120, which may be required to be processed in whole or in part by the results calculator 106 in order to update the key-value delta 120, and ultimately the key-value store 108, in a current, up-to-date manner.

In general, it may be appreciated that the first type of synchronization (i.e., synchronization based on invalidity notifications received at the deltas 120, 124) may occur most frequently and most easily. Meanwhile, the second type of synchronization (i.e., updating of the key-value store 108 and the relational data store 114 using the corresponding key-value delta 120 and relational delta 124, along with the associated emptying of the contents of the deltas 120, 124) may occur relatively less frequently. Finally, in example implementations, the third synchronization process (i.e., to update the database 102 using the transaction log 118) need occur even less frequently.

Figure 7:
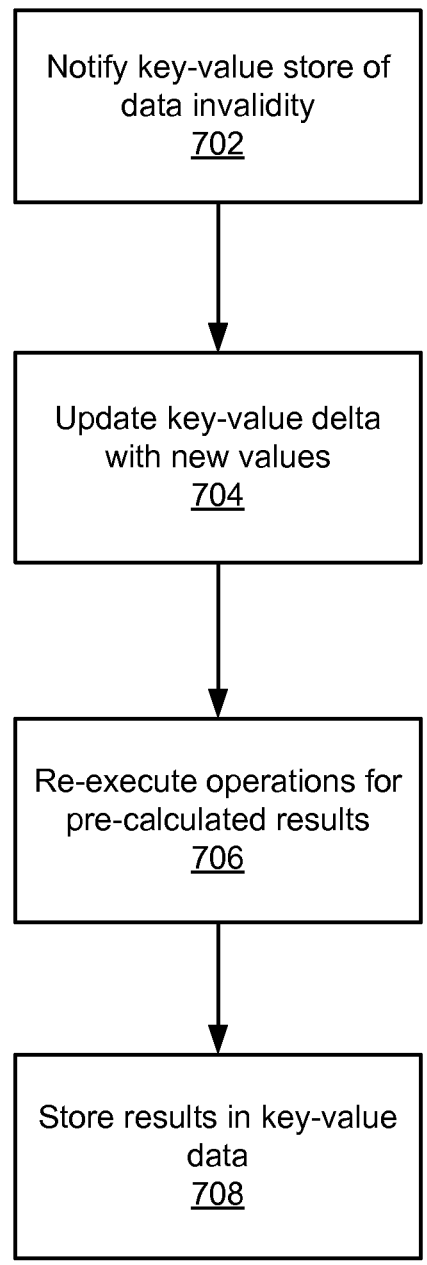
FIG. 7 is a flowchart illustrating example operations for updating the pre-calculated results of FIG. 4.

FIG. 7 is a flowchart 700 illustrating example operations of a reverse synchronization process, associated generally with the arrow 621 of FIG. 6. In the example of FIG. 7, it is assumed that a complex transaction has been executed by the relational store engine 112, and that the relational delta 124 has been updated in conjunction therewith. At the same time, as referenced above with respect to FIG. 6 (e.g., with respect to the operation 620), the invalidity notifier 126 may notify the key-value store engine 110 of such data invalidity (702).

As also described above with respect to FIG. 6, the key-value delta 120 may thus be updated with corresponding new data values (704), e.g., either immediately in conjunction with receipt of the notification of data invalidity, or during an associated synchronization process. Thereupon, the result calculator 106 may be configured to re-execute operations and associated calculations performed previously to provide the pre-calculated results of the key-value store 108, but using the current, updated values of the key-value delta 120 (706).

Consequently, corresponding output of the result calculator 106 may be stored within the key-value delta 120, as well (708). Then, during subsequent transactions executed by the key-value store engine 110, the key-value delta 120 will provide complete and current data needed to ensure that transactions utilizing the key-value store 108 provide current, accurate transaction results.

Figure 8:
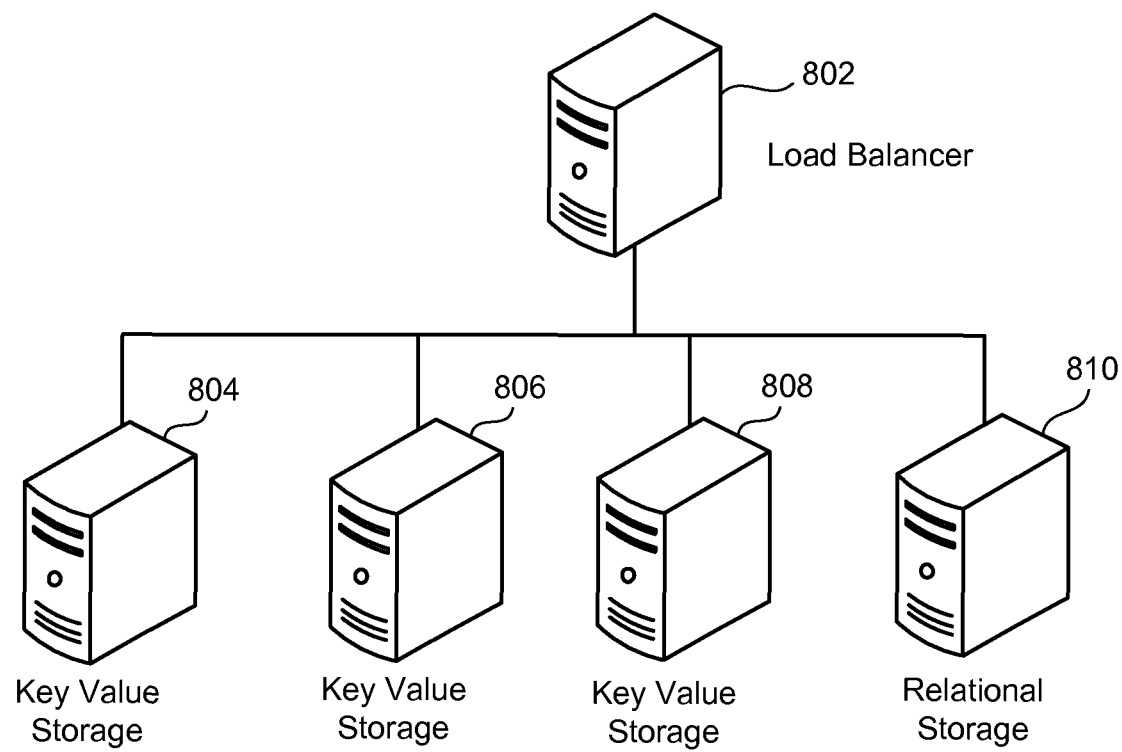
FIG. 8 is a block diagram of an example implementation of the systems of FIGS. 1, 2, using a distributed, scaled architecture.

FIG. 8 is a block diagram illustrating a detailed example implementation of the systems of FIGS. 1 and 2. In the example of FIG. 8, a plurality of computing devices 802-810 are individually used in different roles, in order to implement and optimize the various features and functions described above with respect to FIGS. 1-7.

Specifically, as illustrated, a load balancer 802 may be utilized to implement the request handler 116, the synchronizer 119, and/or the result calculator 106. Meanwhile, computing devices 804, 806, 808 provide individual, parallel implementations of key-value storage components 108, 110. Finally in FIG. 8, a separate computing device 810 is illustrated as implementing the relational storage components 112, 114. In example implementations of the architecture of FIG. 8, the relational store engine 810 may be implemented using, for example, the SAP HANA database system, while the various key value store engines 804, 806, 808 may be implemented using a Java-based application server.

In example implementations, described systems and techniques may be leveraged to ensure transaction isolation, in which a number of data changes are required to be completed together, or, if such completion is not possible, should fail together. In described implementations described herein, however, it may occur in some scenarios that a subset of such a group of data changes may complete successfully and return corresponding results prior to completion of a remainder of the data changes. For example, it may occur that partial results are returned and then a synchronization process fails to complete successfully, so that the system is incapable of providing the entirety of the requested results accurately.

In order to reduce or eliminate related undesirable outcomes, transaction isolation may be maintained within a single storage location (e.g., 804 or 810 of FIG. 8). Then, the related store engine may wait before providing an entire transactional group of results (or, in the case of failure of one or more of the change requests, before providing a corresponding error message).

Additionally, or alternatively, in response to the type of synchronization error referenced above, the synchronization process may be re-tried (in order to maintain data consistency). In the unlikely event of a final synchronization failure, the requesting application may be notified so that it may implement any application-specific corrective measures.

Thus, implementations such as the example of FIG. 8, and various other embodiments of the systems of FIGS. 1 and 2, may provide high speed transaction processing, even for very large data volumes, and/or in the presence of large numbers of concurrent transaction requests. By implementing the key-value store engine 110 and the key-value store 108 and the database layer, rather than the application layer, as illustrated in the example of FIG. 1, potential bottlenecks in the database layer may be avoided.

Further, as illustrated by the example of FIG. 8, the systems of FIGS. 1 and 2 may easily be scaled, to thereby utilize large numbers of computing devices executing in parallel, so that, again, very large volumes of data may be processed very quickly. Further, costs associated with achieving such high levels of performance may be significantly reduced as compared, e.g., to solutions which attempt to rely on large quantities of computational resources in an attempt to achieve similar results.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system inducting instructions recorded on a computer-readable medium, and executable by at least one processor, the system comprising:
    a request handler configured to cause the at least one processor to receive transaction requests for transactions to be executed using data of a database, and further configured to cause the at least one processor to classify a first transaction request of the transaction requests as a simple transaction request, and classify a second transaction request of the transaction requests as a complex transaction request;
    a key-value store engine configured to cause the at least one processor to execute a first transaction satisfying the first transaction request, using a key-value store of pre-calculated results determined prior to receipt of the first transaction request, and based on the data, and further configured to update a key-value delta reflecting a change, if any, of the key-value store caused by the first transaction, wherein the key-value store engine includes a first invalidity notifier configured to update the relational delta based on the updating of the key-value delta;
    a relational store engine configured to cause the at least one processor to execute a second transaction satisfying the second transaction request, using a relational store including a subset of the data, and further configured to update a relational delta reflecting a change, if any, of the relational store caused by the second transaction, wherein the relational store engine includes a second invalidity notifier configured to update the key-value delta based on the updating of the relational delta; and
    a synchronizer configured to cause the at least one processor to execute a two-way synchronization between the key-value store and the relational store, based on the key-value delta and the relational delta.

2. The system of claim 1, wherein the transaction requests are received, at a database layer including the database, from at least one application.

3. The system of claim 1, wherein the request handler is configured to classify the first transaction request and the second transaction request based on classification criteria that characterizes a likelihood of satisfaction thereof using the pre-calculated results of the key-value store.

4. The system of claim 3, comprising a result calculator configured to cause the at least one processor to calculate the pre-calculated results of the key-value store, based on a predicted likelihood of future transaction requests to be received by the request handler.

5. The system of claim 4, wherein the synchronizer is configured to cause the result calculator to update the pre-calculated results in conjunction with the two-way synchronization, based on the key-value delta and the relational delta.

6. The system of claim 1, wherein the key-value store engine is configured to determine a key associated with the first transaction request, and to perform a look-up of a corresponding value within the key-value store.

7. The system of claim 1, wherein the synchronizer is configured to update the relational store based on the relational delta and on updates received from the first invalidity notifier of the key-value store engine, and thereafter empty contents of the relational delta.

8. The system of claim 1, wherein the synchronizer is configured to update the key-value store based on the key-value delta and on updates received from the second invalidity notifier of the relational store engine, and thereafter empty contents of the key-value delta.

9. The system of claim 1, wherein the request handler, key-value store engine, relational store engine, and synchronizer are implemented in main memory of the system.

10. The system of claim 9, wherein the relational store engine is configured to cause the at least one processor to update a transaction log stored in non-volatile memory and update the database with any changes thereto caused by the execution of the first transaction or the second transaction.

11. A computer-implemented method for executing instructions stored on a computer readable storage medium, the method comprising:
    receiving transaction requests for transactions to be executed using data of a database;
    classifying a first transaction request of the transaction requests as a simple transaction request, wherein the simple, transaction request includes a first transaction that at least partially alters data being requested;
    classifying a second transaction request of the transaction requests as a complex transaction request, wherein the complex transaction request includes a second transaction that at least partially alters data being requested;
    executing the first transaction satisfying the first transaction request, using a key-value store of pre-calculated results determined prior to receipt of the first transaction request, and based on the data;
    executing the second transaction satisfying the second transaction request, using a relational store including a subset of the data;
    updating a key-value delta reflecting a change of the key-value store caused by the first transaction;

updating a relational delta reflecting a change of the relational store caused by the second transaction; and executing a two-way synchronization between the key-value store and the relational store, based on the key-value delta and the relational delta.

12. The method of claim 11, wherein updating the key-value delta includes updating the relational delta based thereon, and further wherein updating the relational delta includes updating the key-value delta based thereon.

13. The method of claim 11, wherein the two-way synchronization includes updating the pre-calculated results in conjunction therewith, based on the key-value delta and the relational delta.

14. A computer program product, the computer program product being tangibly embodied on a non-transitory computer-readable storage medium and comprising instructions that, when executed, are configured to:

receive transaction requests for transactions to be executed using data of a database;

classify a first transaction request of the transaction requests as a simple transaction request, wherein the simple transaction request includes a first transaction that at least partially alters data being requested;

classify a second transaction request of the transaction requests as a complex transaction request, wherein the complex transaction request includes a second transaction that at least partially alters data being requested;

execute the first transaction satisfying the first transaction request, using a key-value store of pre-calculated results determined prior to receipt of the first transaction request, and based on the data;

execute the second transaction satisfying the second transaction request, using a relational store including a subset of the data;

update a key-value delta reflecting a change of the key-value store caused by the first transaction;

update a relational delta reflecting a change of the relational store caused by the second transaction; and execute a two-way synchronization between the key-value store and the relational store, based on the key-value delta and the relational delta.

15. The computer program product of claim 14, wherein, in updating the key-value delta, the instructions, when executed, are configured to update the relational delta based thereon, and, in updating the relational delta, the instructions, when executed, are configured to update the key-value delta based thereon.

16. The computer program product of claim 15, wherein the two-way synchronization includes updating the relational store based on the relational delta and on updates received from the key-value store, and thereafter emptying contents of the relational delta, and further wherein the two-way synchronization includes updating the key-value store based on the key-value delta and on updates received from the relational store, and thereafter emptying contents of the key-value delta.

17. The computer program product of claim 14, wherein the two-way synchronization includes updating the pre-calculated results in conjunction therewith, based on the key-value delta and the relational delta.

18. The computer program product of claim 14, wherein the transaction requests are received, at a database layer including the database, from at least one application.

\* \* \* \* \*